Nov. 30, 1965   R. E. SUMMERER   3,221,284
DOMESTIC APPLIANCE
Filed July 24, 1963
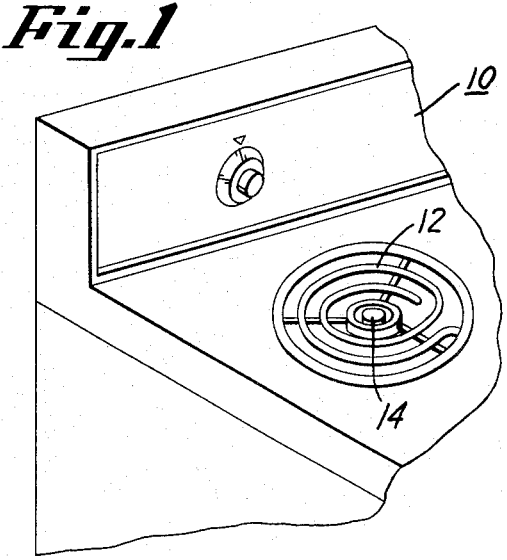
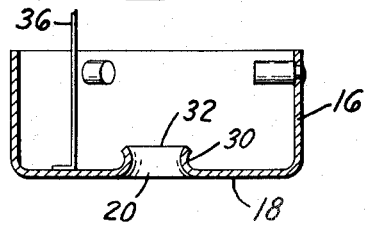
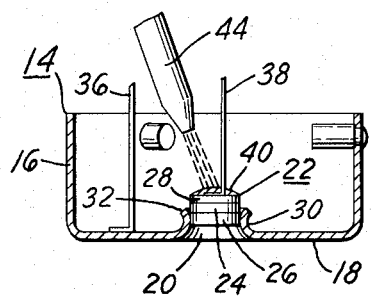
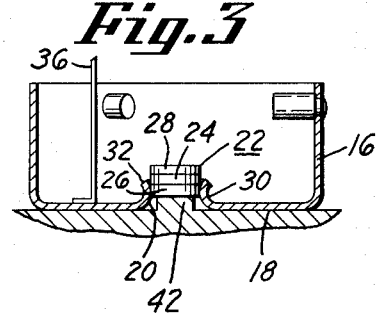
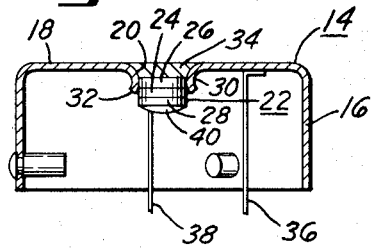
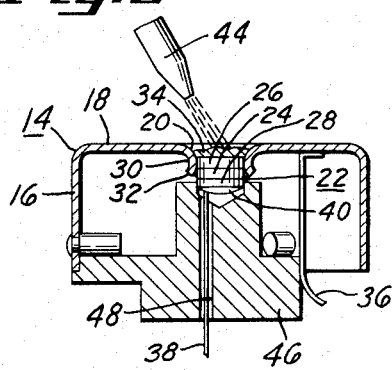
INVENTOR.
RAYMOND E. SUMMERER
BY
*J. C. Evans*
ATTORNEY United States Patent Office 3,221,284
Patented Nov. 30, 1965

3,221,284
DOMESTIC APPLIANCE
Raymond E. Summerer, Grand Blanc, Mich., assignor to General Motors Corporation, Detroit, Mich., a corporation of Delaware
Filed July 24, 1963, Ser. No. 297,275
4 Claims. (Cl. 338—25)

This invention relates to temperature sensors and more particularly to an improved thermistor assembly for sensing the temperature of an object in heat transfer relationship therewith and an improved method of manufacturing such assemblies.

One problem in the use of thermistors for sensing the temperature of an object has been that of providing an arrangement wherein the thermistor is secured on a mounting element to give good shock resistance and mechanical strength to the assembly without impairing the ability of the thermistor to sense temperature.

Accordingly, an object of the present invention is to provide an improved thermistor assembly including the provision of means for making the assembly mechanically strong, shock resistant and highly responsive to temperature changes in an object located in heat transfer relationship therewith.

A further object of the invention is to provide a thermistor assembly including the provision of means for guiding a thermistor element into a press fit relationship with supporting means for improving the mechanical strength, shock resistance and ohmic stability of the assembly.

A further object of the invention is to improve the manufacture of thermistor assemblies by means of a unique method of affixing a thermistor element to a support element.

Further objects and advantages of the present invention will be apparent from the following description, reference being had to the accompanying drawings wherein a preferred embodiment of the present invention is clearly shown.

In the drawings:

FIGURE 1 is a view in perspective of an electrical range including the present invention;

FIGURE 2 is a view in vertical section of the thermistor supporting element of the present invention;

FIGURE 3 is a view partly in section and in elevation showing the thermistor element press fit in the supporting element in accordance with the invention;

FIGURE 4 is a view partly in elevation and partly in section of the thermistor element of the invention being joined to an electrical lead;

FIGURE 5 is a view partly in section and partly in elevation of the thermistor element being connected to the supporting elements; and FIGURE 6 is a view partly in section and partly in elevation of the complete thermistor mounting assembly of the present invention.

Referring now to FIGURE 1, an electrical range 10 is shown including a surface heater 12, for example a coiled Nichrome electrical resistance element having a thermistor sensing assembly 14 of the present invention located within a central opening formed by the surface heating element 12.

The thermistor sensing assembly 14 is adapted to be biased upwardly of the surface heater 12 into intimate heat transfer contact with a utensil supported thereon by the heater 12 for heating thereby. The thermistor sensing assembly 14 will, accordingly, sense the temperature of the utensil and the resistance thereof will vary to condition an electrical control circuit for controlling the energization of the surface heater 12 in accordance with the temperature of the utensil being heated thereby.

Typical means for biasing the thermistor sensing assembly 14 into contact with the utensil and means for controlling the energization of the heating element 12 are set forth in the Long Patent 2,882,379 issued April 14, 1959, with it being understood that the thermistor sensing assembly of the present invention is suited for use in other arrangements where it is desired to sense the temperature of an object for conditioning a control system to vary the energization of an electrical device operatively associated with the object.

In FIGURE 6 the improved thermistor sensing assembly 14 is illustrated as comprising an inverted cup-shaped element 16 having a substantially planar bottom portion 18 including an opening 20 centrally thereof. Within the inverted cup element 16 a thermistor element 22 is located comprising a layer of thermistor material 24 having an electrical coefficient of resistance that varies in accordance with changes in temperature. The layer of thermistor material 24 is representatively illustrated as being generally cylindrical with planar surfaces on either end thereof covered by electrical contacts 26, 28 of a good conductive heat resistant material, for example, cermet. The cermet layer 26 is received within a tubular thermistor element support portion 30 of the cup 16 having one end thereof secured to the planar surface portion 18 around the opening 20 therein and the opposite end thereof flared radially outwardly through a close tolerance lead angle from the side of the cermet layer 26 to serve to guide the thermistor element 22 into a press fit relationship within the tubular portion 30. By virtue of the press fit relationship between cermet layer 26 and portion 30, the thermistor element 22 is electrically and mechanically secured to the cup element 16 by a shock resistant mechanical interconnection having unusually good mechanical strength.

The press fit cermet contact 26 portion of thermistor element 22 is further secured to the cup element 16 by a layer 34 of spray metalized material, for example nickel, that fills the opening 20 in the support element 16 in bonded relationship with the support element 16 and the cermet contact 26 to provide further mechanical strength between the element 16 and the thermistor element 22.

The layer 34 of spray metalized material, in addition to providing an unusually strong mechanical connection between the cup element 16 and the thermistor element 22, also forms a plane surface having a substantial cross-sectional area for conducting heat to the thermistor element 22 for changing the electrical characteristics thereof. A further feature of the invention is that the layer 34 of spray metalized material prevents the passage of any foreign matter across the interface between the support element 16 and the sensing thermistor element 22. Because of the good mechanical and electrical connection between cup element 16 and thermistor element 22 and the impervious character of layer 34, the thermistor assembly 14 stays ohmically stable under adverse environmental conditions.

In order to electrically connect the thermistor element 22 in circuit with a control system, a first strip 36 of electrically conductive material is spot welded to the inside surface of the planar bottom 18 and a second strip 38 of electrically conductive material is secured to the cermet contact 28 by means of a spray metalized layer of material 40, for example nickle, that covers the junction between the conductive strip 38 and the surface of the cermet contact 28 for providing a mechanically strong bond therebetween. By virtue of the above-described structure an electrical path is provided through conductor strip 36, the cup-shaped support element 16, the cermet contact 26, the layer 24 of thermistor material, cermet contact 28 and the conductor 40 with the above-described circuit having a variable resistance according to the temperature of the thermistor material.

Referring now to FIGURES 2 through 4 an improved method for manufacturing thermistor sensing assemblies is illustrated as basically including the steps of forming a supporting element having a tubular, flared end, thermistor element support portion for guiding the thermistor element into press fit relationship with a central diameter portion thereof and then forming a strong union between the supporting element and thermistor element by spray metalizing the juncture therebetween.

More particularly, the method includes aligning a thermistor element such as element 22 in alignment with the flared end 32 of the tubular thermistor receiving portion 30 of the support element 16 and moving the thermistor element into the tubular portion 30 by suitable press means so that the flared portion 32 will guide the element 22 into a press fit relationship with the central portion of the tubular portion 30 as illustrated in FIGURE 3. The method further includes terminating the insertion of the thermistor element 22 into the tubular portion 30 before the layer of thermistor material 24 is in engagement with the cap 16 by suitable means such as a stop 42.

Following pressing the thermistor element into support element 16 the conductor strip 38 is held against contact 28 and joined thereto by overspraying the junction therebetween with a metal spray gun 44 or the like as shown in FIGURE 4.

The final assembly of the thermistor sensing assembly 14 involves setting the press fit cup-shaped supporting element 16 and thermistor element 22 on a small pedestal 46 which contains a hole 48 for receiving the conductor strip 38 as shown in FIGURE 5. The inverted cup-shaped supporting element 16 is then located with the planar bottom 18 thereof facing upwardly and the spray gun 44 flame sprays or metalizes the planar surface 18 at the opening 20 therein to fill it with the layer of metal 34 to bond the supporting element 16 securely to the thermistor element 22. Following the flame spraying, the layer of material 34 is polished smooth and clean by suitable means such as a fine sanding belt machine.

By virtue of the above-described method including the use of a support element having a flared tubular portion with a carefully controlled lead angle for guiding a thermistor element into press fit relationship therewith a rugged thermistor sensing assembly is provided that enables the use of thermistor elements as heat sensing devices under very adserve environmental conditions, for example thermistor elements because of the present invention, can be used for sensing the temperature of an object being heated by the surface heater of an electrical range without being concerned about excessive temperatures and impacting of the sensing assembly by utensils supported on the surface heater.

While the embodiment of the present invention as herein disclosed constitutes a preferred form, it is to be understood that other forms might be adopted.

What is claimed is as follows:

1. A sensor unit comprising, thermistor means, a support element including a planar surface portion having an opening therein and a tubular portion having one end secured to said planar surface portion around the opening therein, said tubular portion having the opposite end thereof flared outwardly, said thermistor means being located and press fitted within said tubular portion and including a portion thereof spaced inwardly of said flared opposite end, and a layer of heat conductive material located within said support element opening bonding said support element to said thermistor means for further securing said thermistor means to said support element, said tubular portion receiving only one of said terminal contacts.

2. A sensor unit comprising, thermistor means having terminal contacts, a support element having an opening therein and a thermistor means support portion, said thermistor means being located and press fitted within said support portion, and a layer of heat conductive material located within said opening bonding said support element to said thermistor means for further securing said thermistor means to said support element, said support element receiving only one of said terminal contacts.

3. A sensor unit comprising, a thermistor element having planar surfaces on opposite ends thereof, a layer of electrically conductive material on each of said planar surfaces, and a support element including a planar surface portion having an opening therein and a tubular portion having one end secured to said planar surface portion around the opening therein, said tubular portion receiving only one of said layers of conductive material in a press fit relationship and having the opposite end thereof flared outwardly to guide said one layer into its press fit within said tubular portion.

4. A sensor unit comprising, a thermistor element having planar surfaces on opposite ends thereof, a layer of electrically conductive material on each of said planar surfaces, a support element including a planar surface portion having an opening therein and a tubular portion having one end secured to said planar surface portion around the opening therein, said tubular portion having the opposite end thereof flared outwardly, said thermistor element being located and press fit within said tubular portion and including a portion thereof spaced inwardly of said opposite flared end, said tubular portion receiving only one of said layers of conductive material and a layer of heat conductive material filling said support element opening and being in engagement with one of said layers of electrically conductive material in bonded relationship therewith for further securing said thermistor element to said support element.

References Cited by the Examiner

UNITED STATES PATENTS

| | | | |
|---|---|---|---|
| 2,484,585 | 10/1949 | Quinn | 338—25 |
| 2,526,251 | 10/1950 | Medlar | 338—30 |
| 2,740,031 | 3/1956 | Addink | 338—28 |
| 2,767,296 | 10/1956 | Welch | 219—504 |
| 2,868,935 | 1/1959 | Howatt | 338—25 |
| 3,037,266 | 6/1962 | Pfister | 29—155.63 |
| 3,078,550 | 2/1963 | Rakowski | 29—155.63 |

RICHARD M. WOOD, *Primary Examiner.*

ANTHONY BARTIS, *Examiner.*